(12) United States Patent
Burgess et al.

(10) Patent No.: US 11,546,296 B2
(45) Date of Patent: Jan. 3, 2023

(54) CLOUD COMPUTING ARCHITECTURE WITH SECURE MULTI-CLOUD INTEGRATION

(71) Applicant: Bank of America Corporation, Charlotte, NC (US)

(72) Inventors: William J. Burgess, Charlotte, NC (US); Kevin Cunningham, Fleming Island, FL (US); Anthony D. Zuress, Charlotte, NC (US); Ira Greenspan, Waxhaw, NC (US); Navin Rajapakse, Hoboken, NJ (US); Kevin D. Schwarz, Weddington, NC (US)

(73) Assignee: Bank of America Corporation, Charlotte, NC (US)

(*) Notice: Subject to any disclaimer, the term of this patent is extended or adjusted under 35 U.S.C. 154(b) by 723 days.

(21) Appl. No.: 16/198,928

(22) Filed: Nov. 23, 2018

(65) Prior Publication Data

US 2020/0127975 A1 Apr. 23, 2020

Related U.S. Application Data

(60) Provisional application No. 62/747,180, filed on Oct. 18, 2018.

(51) Int. Cl.
*H04L 29/06* (2006.01)
*H04L 9/40* (2022.01)
*H04L 9/08* (2006.01)

(52) U.S. Cl.
CPC ........ *H04L 63/0236* (2013.01); *H04L 9/0894* (2013.01); *H04L 63/0209* (2013.01); *H04L 63/0281* (2013.01); *H04L 63/101* (2013.01); *H04L 63/166* (2013.01)

(58) Field of Classification Search
CPC ............... H04L 63/0236; H04L 9/0894; H04L 63/0209; H04L 63/0281; H04L 63/101; H04L 63/166; H04L 41/0892; H04L 67/10; H04L 12/66; H04L 41/12; G06F 9/5077; G06F 11/3006
See application file for complete search history.

(56) References Cited

U.S. PATENT DOCUMENTS

| | | | |
|---|---|---|---|
| 8,565,422 B2 | 10/2013 | Lee et al. | |
| 8,719,590 B1 | 5/2014 | Faibish et al. | |
| 8,839,363 B2 | 9/2014 | Spiers et al. | |
| 8,872,540 B2 | 10/2014 | Shiah et al. | |
| 8,984,610 B2 | 3/2015 | Spiers et al. | |
| 9,015,493 B2 | 4/2015 | Hu et al. | |
| 9,270,459 B2 | 2/2016 | Mukkara et al. | |
| 9,485,099 B2 | 11/2016 | Fu et al. | |
| 9,553,850 B2 | 1/2017 | Bosko et al. | |
| 9,860,214 B2 | 1/2018 | Bian et al. | |
| 9,942,273 B2 | 4/2018 | Lee et al. | |
| 10,007,767 B1 | 6/2018 | Ahmed et al. | |

(Continued)

*Primary Examiner* — Yogesh Paliwal
(74) *Attorney, Agent, or Firm* — Weiss & Arons LLP

(57) ABSTRACT

Aspects of the disclosure relate to cloud computing architectures. A system may include a plurality of clouds. One or more of the clouds may transfer data to another one or more of the clouds. A data integration platform may control the data transfer. The transfer may be securely routed through the data integration platform. The transfer may be logged, and the log may be transmitted to an administrative network.

14 Claims, 4 Drawing Sheets

(56) References Cited

U.S. PATENT DOCUMENTS

Figure 1:
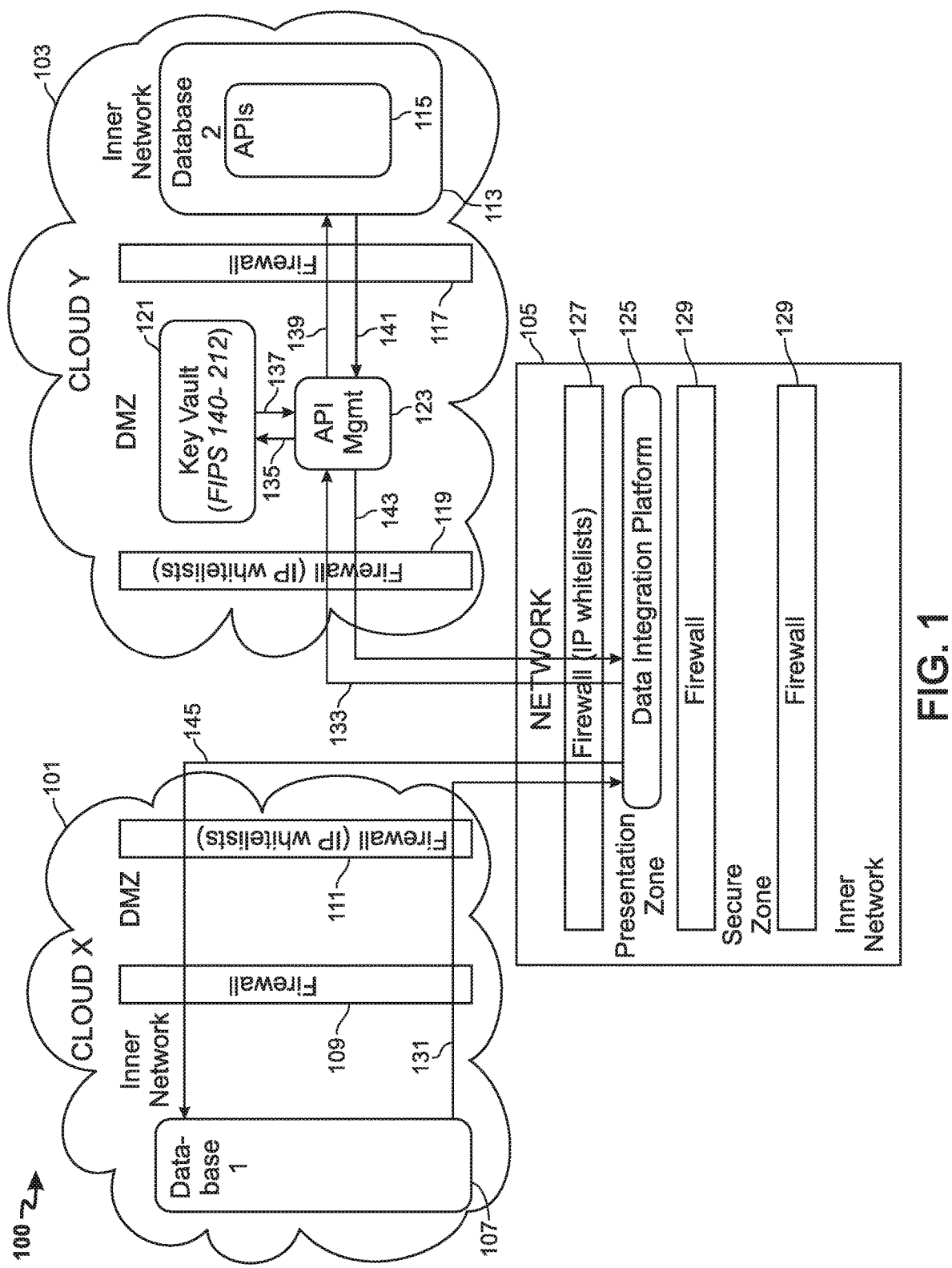

| | | | |
|---|---|---|---|
| 2004/0015857 A1* | 1/2004 | Cornelius | G06F 11/0748 |
| | | | 714/E11.026 |
| 2004/0100507 A1* | 5/2004 | Hayner | H04L 67/22 |
| | | | 715/855 |
| 2007/0209067 A1* | 9/2007 | Fogel | H04L 65/1006 |
| | | | 726/11 |
| 2010/0037303 A1* | 2/2010 | Sharif | G06F 21/31 |
| | | | 726/6 |
| 2011/0035589 A1* | 2/2011 | Butcher | G06F 21/10 |
| | | | 713/168 |
| 2012/0185913 A1* | 7/2012 | Martinez | H04L 12/66 |
| | | | 726/1 |
| 2014/0033271 A1* | 1/2014 | Barton | H04L 51/08 |
| | | | 726/1 |
| 2014/0040888 A1* | 2/2014 | Bookman | G06F 9/46 |
| | | | 718/1 |
| 2014/0067994 A1* | 3/2014 | Puttaswamy Naga | H04L 41/0896 |
| | | | 709/217 |
| 2015/0019488 A1* | 1/2015 | Higginson | G06F 16/214 |
| | | | 707/634 |
| 2018/0210766 A1* | 7/2018 | Beyh | H04L 41/00 |

* cited by examiner

CLOUD COMPUTING ARCHITECTURE WITH SECURE MULTI-CLOUD INTEGRATION

CROSS-REFERENCE TO RELATED APPLICATION

This application is a non-provisional of U.S. Provisional Patent Application No. 62/747,180 filed Oct. 18, 2018 entitled "CLOUD COMPUTING ARCHITECTURE WITH SECURE MULTI-CLOUD INTEGRATION" which is hereby incorporated by reference herein in its entirety.

FIELD OF TECHNOLOGY

Aspects of the disclosure relate to cloud computing architectures. Specifically, aspects of the disclosure relate to cloud computing architectures with secure multi-cloud integration.

BACKGROUND OF THE DISCLOSURE

Many computer-based "clouds" have vast capacity for storing data. A cloud may include a connected network of servers, processors, memory units, and/or other computing devices. The network may be connected, at least in part, via the internet.

The vast storage capacity of a cloud may be well-suited for hosting large databases. The databases may include associated applications. For example, a cloud may host a large dataset. The cloud may also host an application that calculates certain results based on a computation on the large dataset.

A network may use a cloud to host various applications and/or databases. The cloud may be independent from the network. The cloud may host multiple applications and/or databases for the network. The cloud may also host applications and/or databases for other networks. Multiple clouds may host multiple applications and/or databases for the network. The applications and/or databases may include confidential data.

The network may wish to integrate the databases hosted by various clouds. For example, Cloud X may host Database 1 for a network. Cloud Y may host Database 2 for the network. An application associated with Database 1 may want to transmit data from Database 1 to an application associated with Database 2 to receive a certain result. The transfer may expose confidential data to an insecure environment.

It would be desirable, therefore, to provide a system for secure multi-cloud integration.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 1 shows an illustrative system in accordance with principles of the disclosure;

FIG. 2 shows another illustrative system in accordance with principles of the disclosure;

FIG. 3 shows yet another illustrative system in accordance with principles of the disclosure; and FIG. 4 shows still another illustrative system in accordance with principles of the disclosure.

DETAILED DESCRIPTION OF THE DISCLOSURE

Aspects of the disclosure relate to a secure multi-cloud integration system. The system may include a first database stored on a first cloud. The system may also include a second database stored on a second cloud. The system may also include a data integration platform stored on a network. The network may be independent of the first and the second clouds. The data integration platform may control the flow of data from the first database to the second database.

A first application may be associated with, and/or included in, the first database. The first application may or may not be stored on the first cloud. A second application may be associated with, and/or included in, the second database. The second application may or may not be stored on the second cloud. The first and the second application may, in certain embodiments, be the same application.

In some embodiments of the system, the data integration platform may be a self-contained module that is located in an outer section of the network. The outer section of the network may be an outer edge of the network that is accessible from outside the network.

In certain embodiments of the system, the outer section of the network may be protected by a perimeter firewall. The perimeter firewall may filter access from outside the network based at least in part on an internet-protocol ("IP") address whitelist.

In some embodiments, the data integration platform may be divided into a service gateway and an integration package. The service gateway may be located in an outer section of the network. The integration package may be located in an inner section of the network. An inner section may be separated from the outer section by at least one firewall.

In certain embodiments, the system may include a reverse proxy module. The reverse proxy module may be configured to mediate communication between the service gateway and integration package. The reverse proxy module may be located in an intermediate section of the network. The intermediate section may be between, and separated by firewalls from, the inner section and the outer section of the network.

In some embodiments of the system, communication between the first and second databases may be logged. The log may be sent to the network.

In certain embodiments of the system, the first database may be secured behind a first perimeter firewall on the first cloud. The second database may be secured behind a second perimeter firewall on the second cloud. A perimeter firewall on a cloud may be configured to filter access from outside the cloud based at least in part on an internet-protocol ("IP") address whitelist.

In some embodiments, the system may further include at least one inner firewall between the first database and the first perimeter firewall. The system may also include at least one inner firewall between the second database and the second perimeter firewall. An inner firewall may have different filtering criteria that a perimeter firewall.

In some embodiments of the system, each of the first and the second clouds may host a plurality of tenants. One or both of the clouds may host more than 50,000 tenants.

In certain embodiments of the system, some or all communications in the system may adhere to a predetermined cryptographic protocol. The predetermined cryptographic protocol may be transport layer security ("TLS") version 1.2 or later.

In some embodiments, the system may include a key vault module. The key vault module may be configured to create, store, manage, and/or control access to cryptographic keys. In certain embodiments, a key vault module may be hosted on the second cloud. In other embodiments, a key vault module may be hosted on the first cloud. In yet other embodiments, a key vault module may be hosted on both clouds.

In certain embodiments, the key vault module may adhere to at least the Federal Information Processing Standard ("FIPS") Publication 140-2 Level 2 standard.

In some embodiments of the system, communication in the system may adhere to a predetermined tokening protocol. Exemplary tokening protocols may include oAuth1, oAuth2, JSON Web Token ("JWT"), and Security Assertion Markup Language ("SAML").

In certain embodiments of the system, the data integration platform may also control the flow of data from the second database to the first database. This may provide bi-directional control over the flow of data in the system.

In some embodiments, a secure multi-cloud integration system is provided. The system may include a first database stored on a first cloud, and a second database stored on a second cloud. The system may also include a data integration platform that is also stored on the first cloud. The data integration platform may control the flow of data from the first database to the second database.

In some embodiments of the system, the first cloud may be divided into a first sub-cloud and a second sub-cloud. The first database may be located on the first sub-cloud. The data integration platform may be located on the second sub-cloud.

In certain embodiments, the data integration platform may be a module that is located in an inner section of the first cloud. The inner section of the first cloud may be secured behind a perimeter firewall and also behind an additional, inner, firewall. The perimeter firewall may filter access from outside the first cloud based at least in part on an internet-protocol ("IP") address whitelist. The inner firewall may include different, or additional, filtering criteria.

In some embodiments, the system may further include a network that is independent of the first and the second clouds. Communication between the first and second databases may be logged. The log may be sent to the network. The network may use the log for security analysis and review.

The first database in the system may be secured behind a first perimeter firewall on the first cloud. The second database may be secured behind a second perimeter firewall on the second cloud. A perimeter firewall on a cloud may be configured to filter access from outside the cloud based at least in part on an internet-protocol ("IP") address whitelist.

Some embodiments of the system may further include at least one inner firewall between the first database and the first perimeter firewall. At least another inner firewall may be included between the second database and the second perimeter firewall.

In some embodiments of the system, one or both of the databases may be the sole tenant on a cloud. In other embodiments, each of the first and the second clouds hosts a plurality of tenants. In certain embodiments, at least one of the clouds may host more than 50,000 tenants.

In some embodiments of the system, some or all communications in the system may adhere to a predetermined cryptographic protocol. The predetermined cryptographic protocol may be transport layer security ("TLS") version 1.2 or later.

Certain embodiments of the system may further include a key vault module. The key vault module may be configured to create, store, manage, and/or control access to cryptographic keys. In some embodiments, the key vault module may be hosted on the second cloud. The key vault module may preferably adhere to at least the Federal Information Processing Standard ("FIPS") Publication 140-2 Level 2 standard.

In some embodiments, communication in the system may adhere to a predetermined tokening protocol.

In certain embodiments of the system, the data integration platform may also control the flow of data from the second database to the first database.

The system may also include a load balancer module in some embodiments. The load balancer module may be configured to distribute communication traffic across resources of the first and/or the second cloud.

Some embodiments of the system may further include a hardware security module ("HSM"). The HSM may be configured to create, store, manage, and/or control access to cryptographic keys. The HSM may be a physical computing device that safeguards and manages digital keys for strong authentication. The HSM may also provide crypto-processing. In certain embodiments, the HSM may be located on the first cloud. The HSM may be protected by a perimeter firewall. A perimeter firewall may filter access from outside the first cloud based at least in part on an internet-protocol ("IP") address whitelist.

Certain embodiments may provide a secure multi-cloud integration system. The system may include a first database stored on a first cloud, and a second database stored on a second cloud. The first and the second databases may be configured to communicate directly. The direct communication may include a secure transfer of data from the first database to the second database. In certain embodiments, the direct communication may include a secure transfer of data from the second database to the first database.

In some embodiments, the system further includes a network that is independent of the first and the second clouds. Communication between the first and second databases may be logged. The log may be sent to the network.

In certain embodiments of the system, the first database may be secured behind a first perimeter firewall on the first cloud. The second database may be secured behind a second perimeter firewall on the second cloud. A perimeter firewall on a cloud may be configured to filter access from outside the cloud based at least in part on an internet-protocol ("IP") address whitelist.

In some embodiments of the system, at least one inner firewall may be included between the first database and the first perimeter firewall. The system may also include at least one inner firewall between the second database and the second perimeter firewall. The databases may thus be secured behind at least two levels of protection.

In certain embodiments of the system, each of the first and the second clouds may host a plurality of tenants. In some embodiments, at least one of the clouds may host more than 50,000 tenants.

All communications and/or connections in some embodiments of the system may be preferred to adhere to a predetermined cryptographic protocol. The predetermined cryptographic protocol may be transport layer security ("TLS") version 1.2 or later.

Some embodiments of the system may include a key vault module. The key vault module may be configured to create, store, manage, and/or control access to cryptographic keys. In certain embodiments, the key vault module may be hosted on the first cloud. The key vault module may preferably adhere to at least the Federal Information Processing Standard ("FIPS") Publication 140-2 Level 2 standard.

In certain embodiments, communication in the system may use a predetermined tokening protocol.

Some embodiments of the system further include a load balancer module. The load balancer module may be configured to distribute communication traffic across resources of the first and/or the second cloud.

Certain embodiments of the system further include a hardware security module ("HSM"). The HSM may be configured to create, store, manage, and/or control access to cryptographic keys. The HSM may be located on the second cloud. The HSM may also be protected by a perimeter firewall. The perimeter firewall may filter access from outside the network based at least in part on an internet-protocol ("IP") address whitelist.

In some embodiments, the system may include a key vault module stored on the first cloud in addition to the HSM module stored on the second cloud. In these embodiments, the first database may encrypt a communication with a key sourced from the key vault module. The second database may then decrypt the communication with a key sourced from the HSM.

A method for secure multi-cloud integration is provided. The method may include sending, from a first database hosted on a first cloud to a data integration platform stored on a network, a request to transfer data from the first database to a second database hosted on a second cloud.

The method may further include controlling, via the data integration platform based on a predetermined set of controls, the transfer of the data.

The method may also include routing the data from the first database to the second database through the data integration platform.

The method may further include logging, via the data integration platform, the transfer and the content of the data. For example, the log may include details about the transfer, such as a timestamp and the party that initiated the transfer. The log may also include the data, and/or a description of the data, that was transferred. In some embodiments, the log may include transfer requests that were denied.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative diagram of system 100. System 100 may include Cloud X 101, Cloud Y 103, and a network 105.

Cloud X may host Database 1 (107). Database 1 may include and/or be associated with a first application. Database 1 may be secured in an inner section of Cloud X. The inner section may be behind an inner firewall 109 and a perimeter firewall 111.

Cloud Y may host Database 2 (113). Database 2 may include and/or be associated with a second application. Database 2 may include an application programming interface ("API") 115. Database 2 may be secured in an inner section of Cloud Y. The inner section may be behind an inner firewall 117 and a perimeter firewall 119. Cloud Y may also host a Key Vault module 121 and an API Management module 123. The Key Vault module and an API Management module may be hosted in an outer section of Cloud Y. The outer section may be behind the perimeter firewall. The outer section may alternatively be referred to as a demilitarized zone ("DMZ").

The network 105 may include a Data Integration Platform 125. The Data Integration Platform may be hosted in an outer section of the network. The outer section may be behind a perimeter firewall 127. The network may also include one or more inner firewalls 129.

In one embodiment of the system, Cloud X may be a cloud provided by Salesforce.com, Inc. Cloud X may host a platform provided by nCino, Inc. Cloud Y may be a cloud provided by Microsoft Corporation. Cloud Y may host a platform provided by PrecisionLender. In other embodiments, the clouds may include any other suitable clouds and/or networks. The network of the system may be a network associated with a business, organization, entity, or any other suitable network. The network may define security regulations for data transfers. Examples of the Data Integration Platform may include an instance of an Informatica platform, a Mulesoft platform, or any other suitable platform.

An exemplary multi-cloud integration process based on system 100 may include steps 131-145, as follows.

At step 131, Database 1 may issue a request to integrate with Database 2. Integrating may include transmitting data and/or receiving a computational result. For example, Database 1 may include underwriting and fulfillment functionality. Database 2 may include pricing and profitability functionality. Database 1 may request from Database 2 an updated pricing analysis. The request may include transmitting data, and other data may be received in response. The request of step 131 may be received by the Data Integration Platform. Receiving the request may include capturing and/or logging the request. The Data Integration Platform may route the request to Cloud Y at step 133.

Steps 131-137 may include various security steps. For example, the information in the request may be encrypted. The encryption may include the TLS 1.2 protocol, or any other suitable security protocol. Some or all of the traffic in the system may include similar encryption. Data in the request at step 131 may be encrypted before being transmitted outside of Cloud X. Step 135 may include requesting a key from the Key Vault module. Step 137 may include obtaining a key. The key may be used to decrypt the data in the request.

At step 139, the request may be communicated with the API of Database 2. The output from Database 2 may be sent, via the Data Integration Platform, to Database 1 in steps 141-145.

Figure 2:
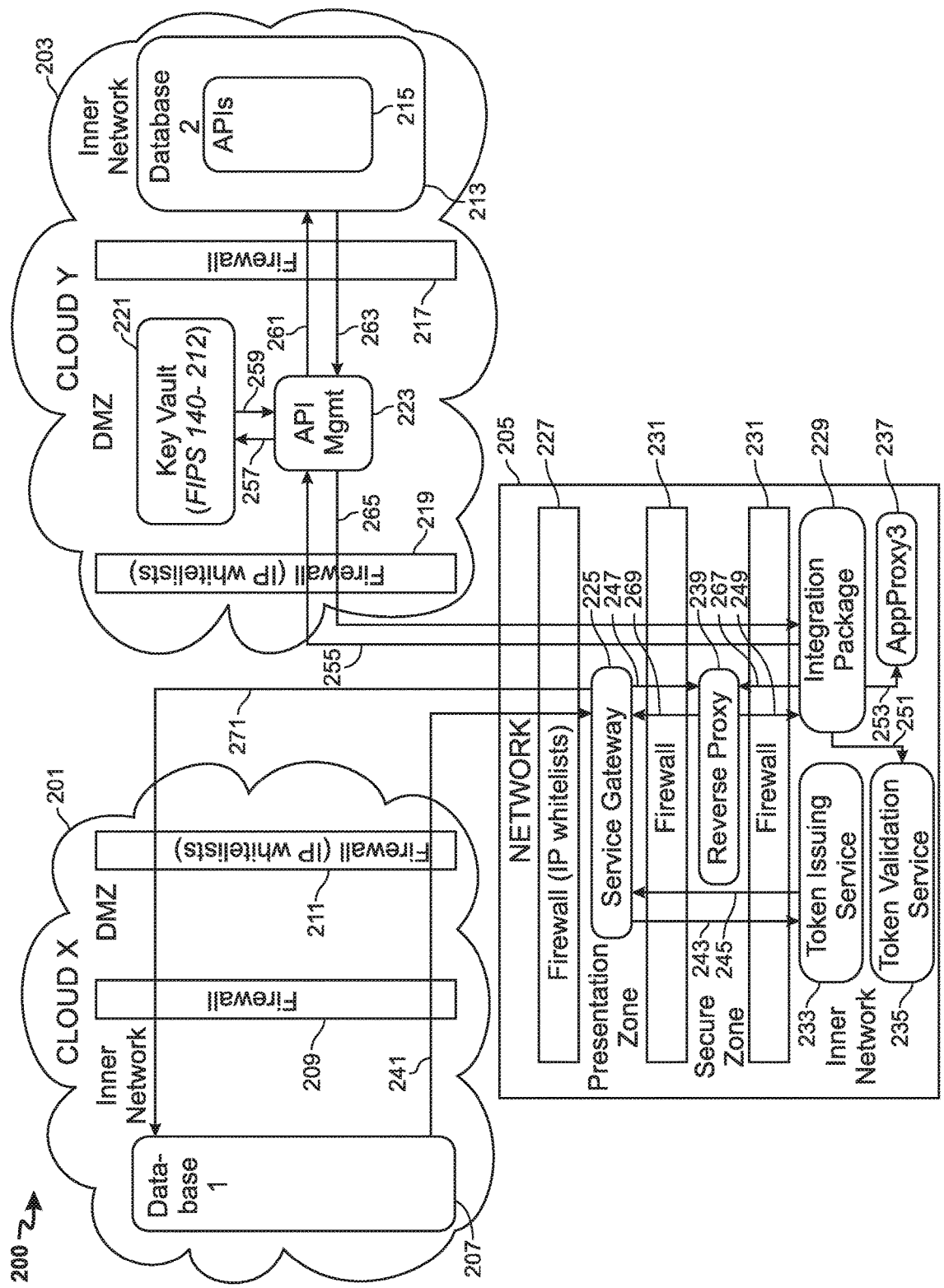

FIG. 2 shows an illustrative diagram of system 200. System 200 may include Cloud X 201, Cloud Y 203, and a network 205.

Cloud X may host Database 1 (207). Database 1 may include and/or be associated with a first application. Database 1 may be secured in an inner section of Cloud X. The inner section may be behind an inner firewall 209 and a perimeter firewall 211.

Cloud Y may host Database 2 (213). Database 2 may include and/or be associated with a second application. Database 2 may include an application programming interface ("API") 215. Database 2 may be secured in an inner section of Cloud Y. The inner section may be behind an inner firewall 217 and a perimeter firewall 219. Cloud Y may also host a Key Vault module 221 and an API Management module 223. The Key Vault module and an API Management module may be hosted in an outer section of Cloud Y. The outer section may be behind the perimeter firewall. The outer section may alternatively be referred to as a demilitarized zone ("DMZ").

The network 205 may include a Data Integration Platform. The Data Integration Platform may be split into multiple component modules. The component modules may be stored in various locations on the network. One component module may be a Service Gateway 225. The Service Gateway may control the entry point to the Data Integration Platform. The Service Gateway may be hosted in an outer section of the network. The outer section may be behind a perimeter firewall 227. This section may be alternatively referred to as a Presentation Zone.

Another component module of the Data Integration Platform may be an Integration Package 229. The Integration Package may be a software and/or hardware package that runs the integration process. The Integration Package may be hosted in an inner section of the network. The inner section may be behind the perimeter firewall, as well as behind additional, inner, firewalls 231.

Other modules on the network may include a Token Issuing module 233, a Token Validation module 235, and an Application Proxy 237. These modules may also be hosted on the inner network.

The network may also host a Reverse Proxy module 239. The Reverse Proxy module may be located in an intermediate section of the network. The intermediate section of the network may be situated between 2 inner firewalls 231.

An exemplary multi-cloud integration process based on system 200 may include steps 241-271, as follows.

At step 241, Database 1 may issue a request to integrate with Database 2. The request may be received and processed by the Service Gateway. Steps 243-253 may be part of the internal processing of the request. Internal processing may include various security and proxy steps.

At step 255, the request may be transmitted to Cloud Y. Steps 257 and 259 may include authentication steps. Authentication steps may involve a key protocol. The request may be communicated to Database 2 at step 261. The communication may be via the API.

Database 2 may respond at step 263. The response may be routed to Database 1, through the Data Integration Platform on the network, in steps 265-271.

Figure 3:
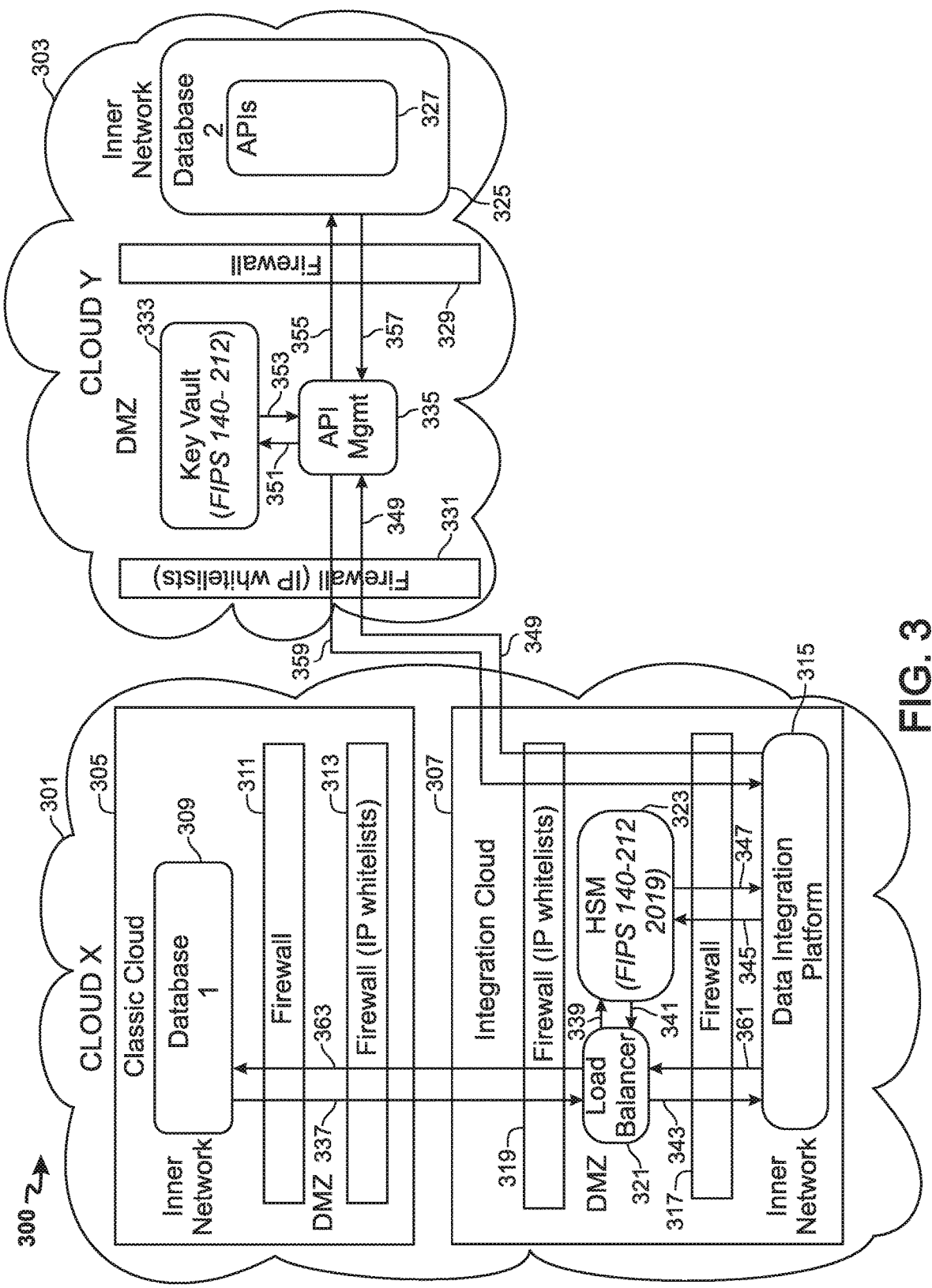

FIG. 3 shows an illustrative diagram of system 300. System 300 may include Cloud X 301, Cloud Y 303, and a network (not shown).

Cloud X may be divided into sub-cloud 1 (305), and sub-cloud 2 (307). The division may be real—i.e., reflective of different resources being used for each. Alternatively, the division may be logical—i.e., to differentiate between functionalities, when in reality the functionalities may utilize the same resources.

Sub-cloud 1 may host Database 1 (309). Database 1 may include and/or be associated with a first application. Database 1 may be secured in an inner section of sub-cloud 1. The inner section may be behind an inner firewall 311 and a perimeter firewall 313.

Sub-cloud 2 may host a Data Integration Platform 315. The Data Integration Platform may be secured in an inner section of sub-cloud 2. The inner section may be behind an inner firewall 317 and a perimeter firewall 319. In other embodiments, the Data Integration Platform may be secured in an outer section of sub-cloud 2. The outer section may be between the inner and perimeter firewalls.

Sub-cloud 2 may also host a Load Balancer module 321 and a hardware security module ("HSM") 323. The Load Balancer module and the HSM may be stored in the outer section of sub-cloud 2.

Cloud Y may host Database 2 (325). Database 2 may include and/or be associated with a second application. Database 2 may include an application programming interface ("API") 327. Database 2 may be secured in an inner section of Cloud Y. The inner section may be behind an inner firewall 329 and a perimeter firewall 331. Cloud Y may also host a Key Vault module 333 and an API Management module 335. The Key Vault module and API Management module may be hosted in an outer section of Cloud Y. The outer section may be behind the perimeter firewall. The outer section may alternatively be referred to as a demilitarized zone ("DMZ").

An exemplary multi-cloud integration process based on system 300 may include steps 337-363, as follows.

At step 337, Database 1 may issue a request to integrate with Database 2. The request may be processed by the Load Balancer, as well as various security modules including the HSM, before reaching the Data Integration Platform at step 343. The Data Integration Platform may route the request through the HSM at steps 345 and 347. The Data Integration Platform may route the request to Cloud Y at step 349.

Steps 351-355 may include authenticating steps as the request is routed to Database 2. The output from Database 2 may be sent, via the Data Integration Platform, to Database 1 in steps 357-363.

Figure 4:
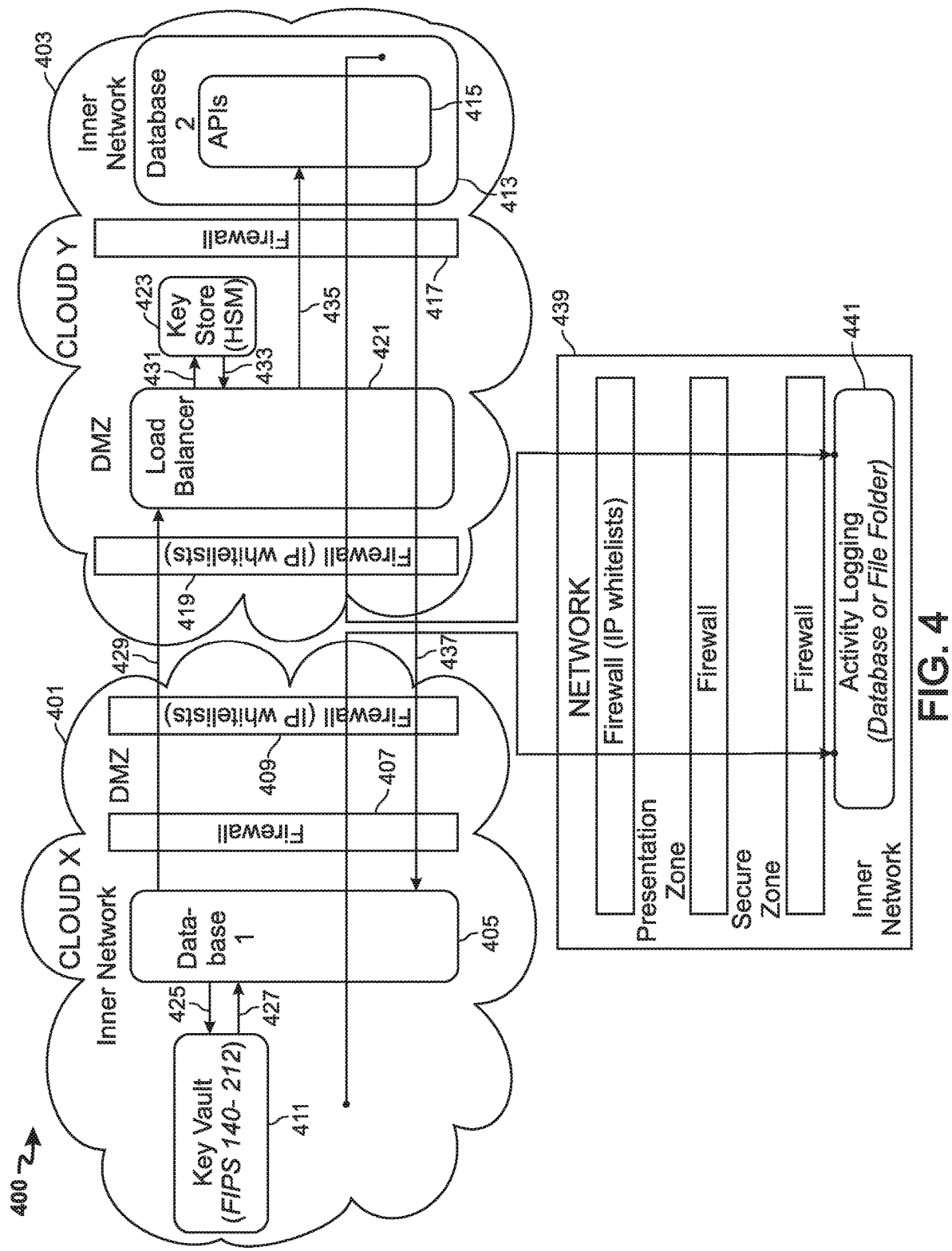

FIG. 4 shows an illustrative diagram of system 400. System 400 may include Cloud X 401, Cloud Y 403, and a network 439.

Cloud X may host Database 1 (405). Database 1 may include and/or be associated with a first application. Database 1 may be secured in an inner section of Cloud X. The inner section may be behind an inner firewall 407 and a perimeter firewall 409. Cloud X may also host a Key Vault module 411. The Key Vault module may be hosted in an outer section of Cloud X. The outer section may be behind the perimeter firewall. The outer section may alternatively be referred to as a demilitarized zone ("DMZ").

Cloud Y may host Database 2 (413). Database 2 may include and/or be associated with a second application. Database 2 may include an application programming interface ("API") 415. Database 2 may be secured in an inner section of Cloud Y. The inner section may be behind an inner firewall 417 and a perimeter firewall 419.

Cloud Y may also host a Load Balancer module 421 and a hardware security module ("HSM") 423. The HSM may alternatively be referred to as a key store. The Load Balancer module and the HSM may be stored in the outer section of Cloud Y.

Network 439 may include an Activity Logging module 441. Activity Logging module 441 may include hardware and/or software—e.g., a database or file folder—that provides a way of logging communication between Cloud X and Cloud Y. Activity Logging module 441 may track and/or store the communication itself as well as information about the communication. Information about the communication may include origin of request, timestamp, data requested, or any other suitable information.

An exemplary multi-cloud integration process based on system 400 may include steps 425-437, as follows.

A request to integrate with Database Y may initiate with step 425. An authentication key may be formulated and/or retrieved from the Key Vault module at steps 425 and 427. The request may be transmitted to Cloud Y at step 429. The request may be routed through the Load Balancer and HSM for management and authentication at steps 431 and 433. The request may be communicated to Database 2 at step 435. The communication may be via the API. At step 437, Database 2 may transmit a response to Database 1.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for cloud computing architecture with secure multi-cloud integration are provided. Persons skilled in the art will appreciate that the present invention can be practiced by other than the described embodiments, which are presented for purposes of illustration rather than of limitation. The present invention is limited only by the claims that follow.

What is claimed is:

1. A secure multi-cloud integration system, said system comprising:
    a software platform stored on a network, said network that is independent of a first cloud and a second cloud;
    a first cryptographic software module hosted on the first cloud, said first cryptographic software module that is configured to create, store, manage, and control access to cryptographic keys; and
    a second cryptographic software module, said second cryptographic software module that is configured to create, store, manage, and control access to cryptographic keys, wherein the second cryptographic software module is hosted on a dedicated hardware unit on the second cloud between an inner firewall and an outer firewall;
    wherein:
    the software platform comprises:
        a first software module comprising a first processor and a first non-transitory memory storing computer executable instructions that is located in an outer section of the network, said outer section of the network that is accessible from outside the network, wherein the first software module is configured to process a data integration request received by the software platform; and
        a second software module comprising a second processor and a second non-transitory memory storing computer executable instructions that is located in an inner section of the network, said inner section that is separated from the outer section by at least one firewall;
    in response to the data integration request, the second software module is configured to control the flow of data from a first database stored on the first cloud to a second database stored on the second cloud; and
    as part of the flow of data, the system is further configured to:
        encrypt the data, at the first cloud via a key from the first cryptographic software module, prior to a transfer of the data;
        transfer the data by routing the data from the first database to the second database through the software platform; and
        decrypt the encrypted data, at the second cloud via a key from the second cryptographic software module, after the transfer of the data.

2. The system of claim 1, wherein the outer section of the network is protected by a perimeter firewall, said perimeter firewall that filters access from outside the network based at least in part on an internet-protocol ("IP") address allow list.

3. The system of claim 1, wherein communication between the first and second databases is logged, and the log is sent to the network.

4. The system of claim 1, wherein the first database is secured behind a first perimeter firewall on the first cloud, and the second database is secured behind a second perimeter firewall on the second cloud, each perimeter firewall on a cloud configured to filter access from outside the cloud based at least in part on an internet-protocol ("IP") address allow list.

5. The system of claim 4, further comprising:
    at least one inner firewall between the first database and the first perimeter firewall; and
    at least one inner firewall between the second database and the second perimeter firewall.

6. The system of claim 1, wherein each of the first and the second clouds hosts a plurality of tenants.

7. The system of claim 6, wherein at least one of the clouds hosts more than 50,000 tenants.

8. The system of claim 1, wherein all communications in the system adhere to a predetermined cryptographic protocol.

9. The system of claim 8, wherein the predetermined cryptographic protocol is transport layer security ("TLS") version 1.2.

10. The system of claim 1 wherein the cryptographic software module adheres to at least the Federal Information Processing Standard ("FIPS") Publication 140-2 Level 2 standard.

11. The system of claim 1, wherein communication in the system adheres to a predetermined tokening protocol.

12. The system of claim 1, wherein the software platform also controls the flow of data from the second database to the first database.

13. The system of claim 1, further comprising a third software module, said third software module that is:
  located in an intermediate section of the network, said intermediate section that is between, and separated by firewalls from, the inner section and the outer section of the network; and
  configured to mediate communication between the first software module and the second software module.

14. A method for secure multi-cloud integration, said method comprising:
  sending, from a first database hosted on a first cloud to a software platform stored on a network, a request to transfer data from the first database to a second database hosted on a second cloud;
  controlling, via the software platform based on a predetermined set of controls, the transfer of the data;
  routing the data from the first database to the second database through the software platform;
  logging, via the software platform, the transfer and the content of the data; and
  transmitting the log to the network;
wherein:
  the software platform comprises:
    a first software module that is located in an outer section of the network, said outer section of the network that is accessible from outside the network, wherein the first software module is configured to process the request; and
    a second software module that is located in an inner section of the network, said inner section that is separated from the outer section by at least one firewall, wherein the second software module is configured to control the transfer of the data in response to the request;
  the first cloud hosts a first cryptographic software module, said first cryptographic software module that is configured to create, store, manage, and control access to cryptographic keys;
  the second cloud hosts a second cryptographic software module, said second cryptographic software module that is configured to create, store, manage, and/or control access to cryptographic keys, wherein the second cryptographic software module is hosted on a dedicated hardware unit on the second cloud between an inner firewall and an outer firewall; and
  the method further comprises:
    encrypting the data, at the first cloud via a key from the first cryptographic software module, prior to the transfer of the data; and
    decrypting the encrypted data, at the second cloud via a key from the second cryptographic software module, after the transfer of the data.

* * * * *